JOHN J. QUACKENBUSH
HERBERT O. CORBETT
INVENTOR.

3,485,907
METHOD FOR MAKING A PRINTED, MULTILAYER TUBINA
John J. Quackenbush, Monroe, and Herbert O. Corbett, Bridgeport, Conn., assignors to National Distillers and Chemical Corporation, New York, N.Y., a corporation of Virginia
Filed Feb. 21, 1966, Ser. No. 529,082
Int. Cl. B29e 27/14
U.S. Cl. 264—89                2 Claims

ABSTRACT OF THE DISCLOSURE

A blown plastic tube is flattened and printed on its outer surface. The tube is then reinflated and is passed through a circular extrusion die which extrudes a transparent film coating on the printed surface of the reinflated tube, thereby to encapsulate the printing.

---

This invention relates to a novel process for coating a tubular thermoplastic film with a plastic sheath after the film has been extruded and printed, with the extruded sheath covering and protecting the printed material.

Apparatus for the extrusion of tubular thermoplastic films, known as "blown" film, is well known to those skilled in the art.

After the extrusion of blown film, it is frequently desired to print on the film with suitable printing inks, or the like. The printing of various types of thermoplastic materials frequently requires a previous complex film treatment before ink will adhere to the film. Moreover, after printing, the outer printed material is subject to scuff and rub-off problems.

The principle of the present invention is to extrude the tubular film in the normal manner and thereafter perform a treating step to at least partially prepare the extruded film for printing, and thereafter to print the desired pattern on the film. Thereafter, however, the tubular film which has been flattened during the printing process is reinflated and an outer tubular coating of transparent thermoplastic film is extruded onto the printed tube, thereby to completely encapsulate the printed material.

This eliminates scuff or rub-off problems of the printed material, and further encapsulates the printed material in such a manner as to render it incapable of contaminating foodstuffs, or the like, which are to be packaged in the tubular film.

As pointed out above, preferably a treating step is applied to the film prior to printing, although it is possible with the present invention to eliminate the treatment apparatus, since inks will at least partially adhere to most thermoplastic materials, at least temporarily, without treatment with the subsequent coating apparatus securely locking the ink in position on the untreated film surface.

Accordingly, a primary object of this invention is to eliminate the rub-off and scuff problems presently existent in printed thermoplastic tubes.

Another object of this invention is to encapsulate printed material in blown film between the main film tube and an exterior film coating of transparent material.

A further object of this invention is to encapsulate the printed material on blown film between two plastic layers to prevent the printing ink from being acessible for contamination of packaged products.

These and other objects of this invention will become apparent from the following description when taken in connection with the drawings, in which:

FIGURE 1 schematically illustrates the novel apparatus of the invention in a line diagram.

Figure 1:
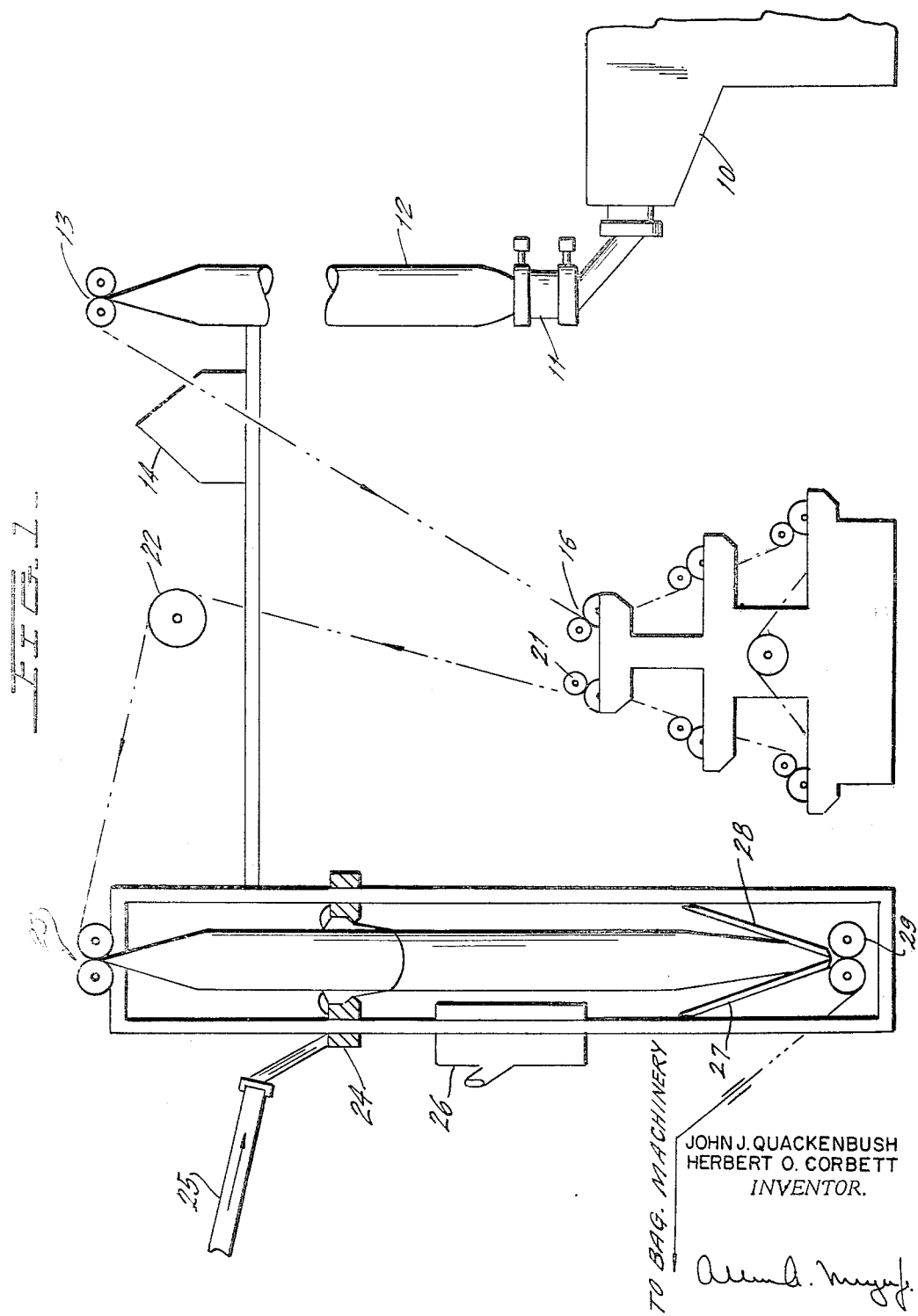

Referring first to FIGURE 1, there is illustrated therein a standard extruder 10 which extrudes a plastic tube 12 through a suitable extrusion die 11. Note that die 11 may be of any standard type and that the extruded tube may also be of any desired type including one or more layers of extruded film laminated together.

The tube 12 is passed through upper nip-rolls 13 which collapse the tube to a flattened form in the usual manner, and the outer film surfaces are then passed through a suitable treating stage 14 which could be of any desired well known type. The web then passes through a suitable printing apparatus, schematically illustrated as the six-color printing press 15, which has printing stages 16 through 21, and the film is then printed in any suitable manner within the printing press 15. Thereafter, the film is redirected over a roll 22, and is applied to the coating stage which has an upper pair of nip-rolls 23.

After the film passes through the upper nip-rolls 23, it is reinflated, as illustrated, and is passed through a second extrusion zone including an extrusion die 24 which is connected to a suitable extruder 25 for the purpose of extruding a thin coat of thermoplastic and preferably transparent material over the printed tube to completely surround said printed tube and provide a laminated multilayer tube having printed material encapsulated between the layers thereof. Thereafter, the film may be passed through a suitable auxiliary air-cooling stage, schematically illustrated as air-cooling ring 26, which may be of any standard well known variety, and the tube may be then collapsed, as schematically illustrated by plates 27 and 28. The tube is then cooled by chill-rolls 29, and is thence taken to a suitable storage stage as where the film is wound into rolls, or to a bag-forming machine.

Figure 3:
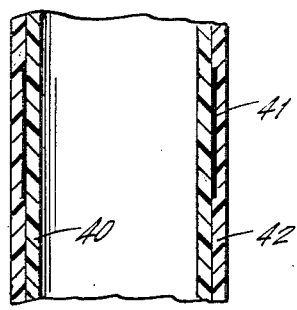
FIGURE 3 is a cross-sectional view of the final extruded tube having the printed material contained between the main tube body and the external coating.

Note that the film which leaves chill-rolls 29 will have the configuration shown in FIGURE 3 of an interior tube portion 40, which is the initally extruded tube coming from extruder 10 which has suitable inks 41 deposited thereon in the printing stage 15, with the printing 41 being encapsulated between the tube 40 and an exterior tube 42 which is coated thereon in the coating stage including die 24.

Figure 2:
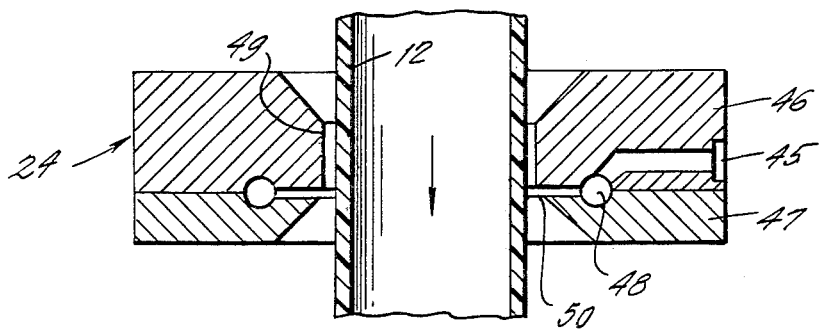
FIGURE 2 illustrates the coating die used in FIGURE 1 in cross-sectional view.

Die 24 may be of any standard variety, and could have the configuration shown, for example, in FIGURE 2. Thus, in FIGURE 2, the tubular web 12 passing through the die 24 is coated with plastic material from extruder 25 which is connected to the extrusion input channel 45. The extrusion channel 45 is placed in the upper deck 46 of the two-deck extrusion device which has a lower deck 47. An annular orifice 48 is then defined between the upper and lower decks 46 and 47 (which are secured together in any desired manner, not shown), whereby the tube 12 is moved through the central opening 49 in decks 46 and 47, and plastic material flowing from channel 48 through the annular discharge orifice 50 will coat the exterior of tube 12 as it moves downwardly.

The embodiments of the invention in which an exclusive privilege or property is claimed are defined as follows:

1. The process for forming a multilayer printed thermoplastic tube comprising the steps of continuously extruding a hollow blown film tube of thermoplastic material, cooling and flattening said blown tube, printing on the outer surface of said tube of thermoplastic material while in its flattened condition, reinflating said tube, passing said reinflated tube through a second extrusion zone and simultaneously extruding a second film tube of transparent thermoplastic material which coaxially and externally completely surrounds said reinflated hollow tube and which coats on to said outer surface of said hollow tube to provide a multilayer tube having the printing on said outer surface of said hollow tube encapsulated between the layers thereof, passing said multilayer tube through a cooling zone to complete the processing thereof, and flattening said multilayer tube.

2. The process as set forth in claim 1 which includes the step of treating said outer film surface prior to printing thereon.

References Cited

UNITED STATES PATENTS

| | | | |
|---|---|---|---|
| 2,513,106 | 6/1950 | Prendergast | 264—173 X |
| 2,810,424 | 10/1957 | Swartswelter et al. | 264—173 X |
| 2,626,426 | 1/1953 | Stahl | 264—173 X |
| 3,068,516 | 12/1962 | Hofer | 264—95 |
| 3,117,053 | 1/1964 | Lawrence et al. | 264—132 X |
| 3,172,571 | 3/1965 | Marchak | 264—132 X |
| 3,182,103 | 5/1965 | Blaylock et al. | 264—132 X |
| 3,286,005 | 11/1966 | Cook | 264—132 X |
| 3,330,709 | 7/1967 | Zelnick | 264—132 X |

ROBERT F. WHITE, Primary Examiner

T. J. CARVIS, Assistant Examiner

U.S. Cl. X.R.

117—7, 12, 94; 264—95, 132, 173